United States Patent [19]

Arroyo et al.

[11] Patent Number: 5,389,442
[45] Date of Patent: Feb. 14, 1995

[54] WATER BLOCKING STRENGTH MEMBERS

[75] Inventors: Candido J. Arroyo, Lithonia; Jill B. Fluevog, Norcross; Krishnaswamy Kathiresan, Marietta; Parbhubhai D. Patel, Dunwoody, all of Ga.

[73] Assignee: AT&T Corp., Murray Hill, N.J.

[21] Appl. No.: 982,252

[22] Filed: Nov. 25, 1992

Related U.S. Application Data

[60] Continuation-in-part of Ser. No. 764,969, Sep. 25, 1991, abandoned, which is a continuation of Ser. No. 463,076, Jan. 10, 1990, abandoned, which is a division of Ser. No. 217,486, Jul. 11, 1988, Pat. No. 4,913,517.

[51] Int. Cl.⁶ .............................................. D02G 3/00
[52] U.S. Cl. ..................... 428/396; 428/375; 428/378; 428/394; 428/395; 385/103; 385/113
[58] Field of Search ............... 428/377, 375, 395, 394; 174/107, 23 C, 23 A, 70 S; 57/243; 385/100, 113

[56] References Cited

U.S. PATENT DOCUMENTS

| | | | |
|---|---|---|---|
| 4,308,416 | 12/1981 | Herman et al. | 428/377 |
| 4,419,157 | 12/1983 | Ferrentino | 428/377 |
| 4,455,348 | 6/1984 | Pokorny | 428/377 |
| 4,703,998 | 11/1987 | Uchioke et al. | 350/96.23 |
| 4,767,184 | 8/1988 | Ozasawara et al. | 350/96.23 |
| 4,779,953 | 10/1988 | Ohta et al. | 428/375 |
| 4,888,378 | 12/1989 | Katz et al. | 428/378 |
| 4,913,517 | 4/1990 | Arroyo et al. | 174/70 S |
| 4,966,809 | 10/1990 | Tanaka et al. | 428/377 |
| 4,992,332 | 2/1991 | Kamei et al. | 428/375 |
| 5,204,175 | 4/1993 | Umeda et al. | 428/288 |
| 5,264,251 | 11/1993 | Geursen et al. | 428/395 |

FOREIGN PATENT DOCUMENTS

351100 1/1990 European Pat. Off.

OTHER PUBLICATIONS

"Fiber-Optic Cable for Shipboard Systems", Kathiresan et al., International Wire & Cable Symposium Proceedings, Nov. 1988, pp. 303-314.

"A Highly Effective Approach to Waterproofing Cables", H. Hughes et al., 1984 International Wire & Cable Symposium.

Primary Examiner—Patrick J. Ryan
Assistant Examiner—J. M. Gray
Attorney, Agent, or Firm—Donald E. Hayes, Jr.

[57] ABSTRACT

A communications cable (20) comprising a core (22) of at least one transmission media and a plastic jacket (34) includes provisions for preventing the movement of water within the cable. The cable includes a strength system (32) including longitudinally extending fibrous strength members (33—33) having a relatively high modulus and having water blocking provisions. In one embodiment, each fibrous strength member is treated with a superabsorbent liquid material which when dry fills interstices and covers portions of the exterior thereof. In another embodiment, a filamentary strand material comprising a water swellable fibrous material is wrapped about each fibrous strength member.

2 Claims, 3 Drawing Sheets

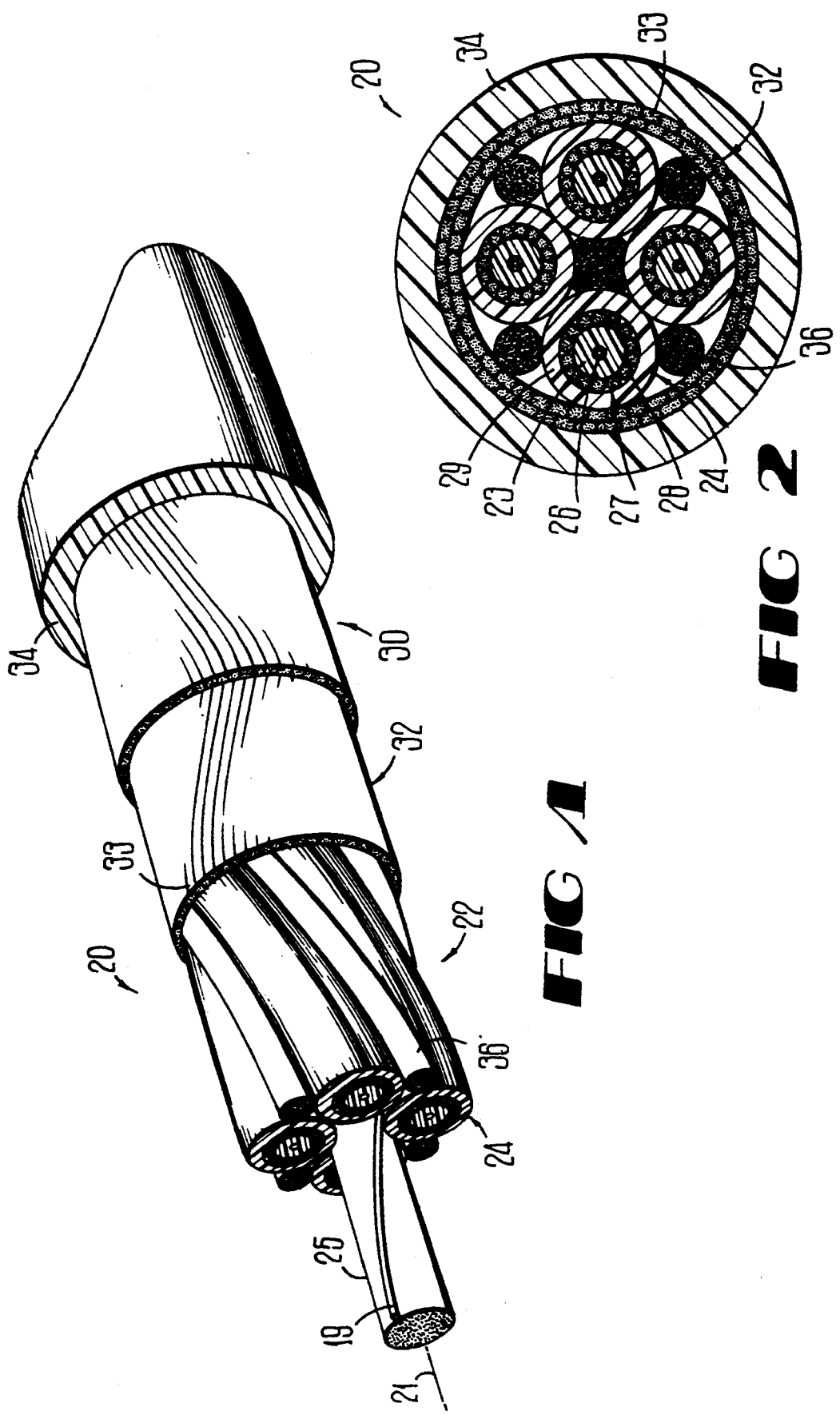

WATER BLOCKING STRENGTH MEMBERS

This is a continuation-in-part application of Ser. No. 07/764,969, filed Sep. 25, 1991, now abandoned, which is a continuation application of Ser. No. 07/463,076, filed Jan. 10, 1990, now abandoned, which is a divisional application is Ser. No. 07/217,486, filed Jul. 11, 1988, which issued as U.S. Pat. No. 4,913,517 on Apr. 3, 1990.

TECHNICAL FIELD

This invention relates to water blocking strength members. More particularly, it relates to strength member facilities which may be used for preventing the passage of water through a sheath system of the cable and the longitudinal migration of water along the interior of the cable.

BACKGROUND OF THE INVENTION

In the cable industry, it is well known that changes in ambient conditions lead to differences in vapor pressure between the inside and the outside of a plastic cable jacket. This generally operates to diffuse moisture in a unidirectional manner from the outside of the cable to the inside of the cable. Eventually, this will lead to an undesirably high moisture level inside the cable, especially if a plastic jacket is the only barrier to the ingress of the moisture. High levels of condensed moisture inside a cable sheath system may have a detrimental effect on the transmission characteristics of a metallic conductor cable.

Furthermore, water may enter the cable because of damage to the cable which compromises its integrity. For example, rodent attacks or mechanical impacts may cause openings in the sheath system of the cable to occur, allowing water to enter, and, if not controlled, to move longitudinally along the cable into splice closures, for example.

Lately, optical fiber cables have made great inroads into the communications cable market. Although the presence of water itself within an optical fiber cable is not detrimental to its performance, passage of the water along the cable interior to connection points or terminals or associated equipment inside closures, for example, may cause problems especially in freezing environments and should be prevented.

In the prior art, various techniques have been used to prevent the ingress of water through the sheath system of a cable and along the core. For example, a metallic shield which often times is used to protect a metallic conductor cable against lightning and rodent attacks is provided with a sealed longitudinal seam. Generally, metallic shields are not preferred for use in optical fiber cables. Forming of the shields about a cable core requires the use of relatively low manufacturing line speeds. Also the use of a metallic shield is destructive of the otherwise all-dielectric property of an optical fiber cable.

Because lightning strikes may cause holes in a metallic shield, it is not uncommon to include additional provisions for preventing the ingress of water into the core. Water blocking materials have been used to fill cable cores and to coat portions of cable sheath systems to prevent the movement longitudinally thereof of any water which enters the cable. Although the use of a filling material, in the form of a grease, causes housekeeping problems, inhibits line speeds because of the need to fill carefully interstices of the cable core and presents problems for field personnel during splicing operations, for example, it continues to be used to prevent entry of the water into the core.

Presently, many commercially available cables also include a water swellable tape. The tape is used to prevent the travel of water through the sheath system as well as its travel longitudinally along the cable to closures and termination points, for example. Such a tape generally is laminated, including a water swellable powder which is trapped between two cellulosic tissues. Although such a tape provides suitable water protection for the cable, it is relatively expensive and thick. If the tape is too thick, the diameter of the cable is increased, thereby causing problems in terminating the cable with standard size hardware.

The problem of cable size caused by bulky tapes has been overcome. In U.S. Pat. No. 4,867,526, which issued on Sep. 19, 1989, in the name of C. J. Arroyo, a cable having water blocking provisions is disclosed. Interposed between a core and a jacket is an elongated substrate member which comprises an impregnated non-metallic, non-woven, web-like material in the form of a tape. The tape material is relatively compressible and has sufficient porosity to permit entry of sufficient impregnating material so that it provides enhanced water blocking capability. The impregnating material may comprise a film of a water swelling or so-called superabsorbent material.

In another prior art cable, a water blockable yarn is interposed between a core tube and an outer surface of a jacket of the cable's sheath system. The yarn extends linearly along the cable or may be wrapped helically about a portion of the sheath system. The yarn may be one which is composed of a superabsorbent fiber material which upon contact with water swells and inhibits the movement of water within the cable.

Although the foregoing arrangements provide excellent water blocking capabilities, they may result in a somewhat increased cable diameter, require additional manufacturing steps such as splicing or inhibit the use of faster line speeds. What is sought after is a cable having water blocking provisions which are provided by way of an existing element of the cable system, thereby avoiding an increase in cable diameter and facilitating improved manufacturing efficiencies. Smaller sizes result in more cable on a given reel and the ability to use presently available hardware associated with cable connections. Any reduction in size must be accomplished without compromising the strength of the cable which in optical fiber cable requires a separate strength member or members. Further desirable is that the cable structure which includes water blocking provisions be relatively flexible.

Also, cables for special applications may have more demanding requirements for blocking water than for cable used in commonplace applications. For example, a typical requirement for a cable is that no water flows through a one meter cable sample when the sample is subjected to a water head of one meter over one hour. In one special application, a cable to be acceptable must not allow any more than thirty-three cubic centimeters of water to move beyond one meter of cable when subjected to a water head, i.e. pressure, of seventeen meters over six hours.

Seemingly, the prior art does not include a cable in which water blocking provisions are integrated into an element or elements of an existing cable structure substantially without any increase in cable diameter. The sought-after cable must be such that it is easily manufacturered and use commercially available materials and must be capable of blocking the flow of water under relatively high pressures.

SUMMARY OF THE INVENTION

The foregoing problems of the prior art have been overcome by strength members of this invention. A cable includes a core which may include optical fibers or metallic conductors and a plastic jacket. The cable also includes a relatively supple strength member system which extends longitudinally along the cable. In a preferred embodiment, the strength member system is comprised of KEVLAR ® yarn which is a relatively supple fibrous material. Components of the strength member system are characterized by a relatively high modulus, that of KEVLAR yarn being on the order of about 6,900 MPa. The strength member system is provided with water blocking provisions.

In one embodiment, fibrous strength members are coated with a superabsorbent material which also fills interstices among the filamentary material thereof. In another embodiment, a strand or strands of a superabsorbent fibrous material is wrapped helically about each fibrous strength member.

Further, the cable may include supplementary water blocking members. Interstices are formed between optical fiber components which are arrayed about a central member and a jacket. Fibrous water blocking members may be disposed in these interstices. These water blocking members differ from the primary water blocking members in that they do not provide tensile strength.

BRIEF DESCRIPTION OF THE DRAWING

Other objects and features of the present invention will be more readily understood from the following detailed description of specific embodiments thereof when read in conjunction with the accompanying drawings, in which:

FIG. 1 is a perspective view of a communications cable having a sheath system which includes a water blockable strength member system with various layers of the sheath system broken away and some of the layers exaggerated in thickness for purposes of clarity;

FIG. 2 is an end sectional view of the cable of FIG. 1 which illustrates some elements of the cable in greater detail;

DETAILED DESCRIPTION

Figure 3:
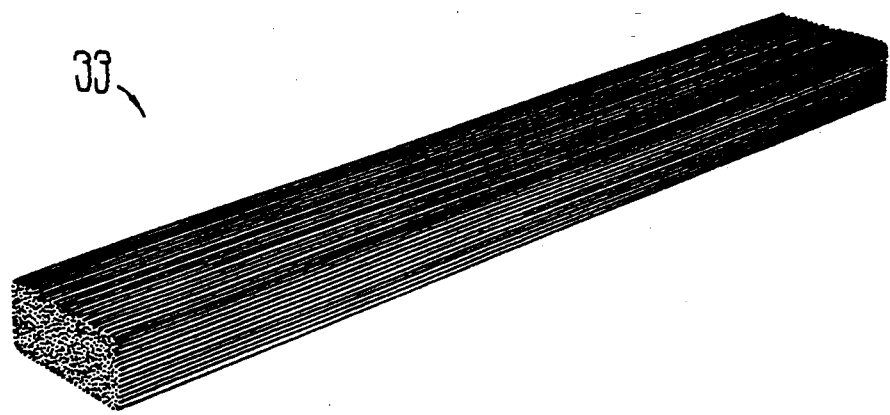
FIG. 3 is a perspective view of a water blocking strength member of the cable of FIG. 2.

Referring now to FIGS. 1 and 2, there is shown a communications cable which is designated generally by the numeral 20. It includes a longitudinal axis 21 and a core 22 comprising one or more optical fiber cable components 24—24 which are arrayed about a central organizer member 25 which comprises a water blocking material in the form of yarn, for example. A binder 19 is wrapped about the central member 25.

Each of the optical fiber cable components 24—24 may comprise an optical fiber which is enclosed in a single or in dual layers of coating material and which has an outer diameter of about 250 $\mu$m. In the alternative, and as shown in FIG. 2, the optical fiber cable component may comprise an optical fiber 26 which includes a single or dual layers of a coating material and which is buffered, that is enclosed in a layer 23 of plastic material such as HYTREL ® plastic, for example. A strength member system 27 encloses the buffered optical fiber and a plastic jacket 29 encloses the strength member system. Typically, the strength member system 27 is comprised of a plurality of strength members 28—28 each comprising a fibrous material which has been impregnated with a superabsorbent material.

One such fibrous strength member is KEVLAR ® yarn, a product which is available commercially from E. I. DuPont de Nemours. KEVLAR ® is a DuPont trademark for a family of aramid fibers. Such fibrous material may be short fiber as well as continuous filament yarn. It has a relatively high tensile strength and its properties are reported in Information Bulletin K-506A dated June, 1980 and entitled "Properties and Uses of KEVLAR ® 29 and KEVLAR ® 49 In Electromechanical Cables and Fiber Optics".

Typically, such strength members are characterized by suitable tensile properties such as tensile strength elongation and modulus, which is sometimes also referred to as stiffness. As used herein, tile tensile strength is an indication of the breaking strength of a strength member, elongation an indication of longitudinal distortion at the breaking point and modulus an indication of how much the strength member is extended for a particular load.

As used in a cable in accordance with the present invention, each of the foregoing tensile properties is important in order to prevent undue stresses and strain from adversely effecting the optical fiber. The particular tensile properties of one acceptable yarn product, namely Kevlar ®, are presented in Table I. Specifically, Kevlar ®, is depicted as having a tensile strength of 2930 MPa, an elongation at break of 2.5% and a modulus of 114,000 MPa.

TABLE I

| KEVLAR* ARAMID FIBER OPTIC DATABASE KEVLAR* 49 ARAMID YARN PROPERTIES | | |
|---|---|---|
| | U.S. UNITS | METRIC UNITS |
| Tensile Strength | | |
| Resin Impregnated Strands | 525,000 psi | 3,620 MPa |
| Dry Yarn | 425,000 psi | 2,930 MPa |
| Tensile Modulus | | |
| (single filament) | 18 × 10$^6$ psi | 124,000 MPa |
| (yarn) | 16.5 × 10$^6$ psi | 114,000 MPa |
| Elongation at Break | 2.5% | 2.5% |
| Density | 0.05 lbs/in$^3$ | 1.44 g/cm$^3$ |
| Filament Diameter (1.42 dpf) | 0.00047 in | 0.00119 cm |
| Specific Tensile Strength** | 10 × 10$^6$ in | 25.4 × 10$^6$ cm |
| Specific Tensile Modulus** | 3.5 × 10$^8$ in | 8.8 × 10$^8$ cm |
| Coefficient of Friction | | |
| Yarn-to-Yarn | 0.46 | 0.46 |
| Yarn-to-Metal | 0.41 | 0.41 |
| Knot Strength | 35% of Tensile Strength | |
| Moisture Regain (55% RH; 22° C.) 72° F. | 3.5% | |
| Time to Reach Equilibrium | 22 hrs | |

TABLE I-continued
KEVLAR* ARAMID FIBER OPTIC DATABASE
KEVLAR* 49 ARAMID YARN PROPERTIES

| | U.S. UNITS | METRIC UNITS |
|---|---|---|
| Maximum Temperature Long-Term Use in Air | 320° F. | 160° C. |
| Decomposition Temperature | 930° F. | 500° C. |
| Longitudinal CTE*** (0-100° C.) | −2.8 ppm/°F. | −5 ppm/°C. |
| Transverse CTE*** (0-100° C.) | $33 \times 10^{-6}$ ppm/°F. | $59 \times 10^{-6}$ ppm/°C. |
| Specific Heat, R.T. | 0.34 BTU/lb°F. | 1420 Joule/Kg°C. |
| Heat of Combustion | 15,000 BTU/lb | $34.8 \times 10^6$ Joule/Kg |
| Dielectric Constant**** | 4.0 @ 1 MHz frequency | |

*Du Pont Registered Trademark
**Tensile modulus or strength divided by density
***Coefficient of Thermal Expansion.
****Estimated from epoxy composite data using rule of mixtures

TABLE II
KEVLAR* ARAMID FIBER OPTIC DATABASE
PRODUCT DATA SHEET
E. I. du Pont de Nemours & Co. (Inc.)

| | |
|---|---|
| PRODUCT DESCRIPTION/TYPE | KEVLAR* 49 Aramid Yarn 2160-1000-T968 |
| PRODUCT UNIT | Tube |
| DATE EFFECTIVE | 10/7/86 |
| MERGE NO. | 1G252 |
| FEATURES | Round Cross Section, High Tenacity, High Modulus, Homopolymer |
| CUSTOMER USE/END USE | Fiber Optics |
| USE EXCEPTIONS | None |

| | OBSERVED VALUES ± 3σ | | TEST METHOD | |
|---|---|---|---|---|
| PROPERTY | Nominal | Typical Range | Du Pont | Comparable ASTM Stds. |
| Tenacity, gpd | 21.5 | 19.0–24.0 | 8032 | D1907 |
| Break Strength, lbs | 102.5 | 89.0–116 | 8032 | D885 (1) |
| Modulus, gpd (4) | 850 | 750–950 | 8032 | D885 (1) |
| Elongation @ Break, % (4) | 2.40 | 1.90–2.90 | 8032 | D885 (1) |
| Denier (ASTM Option 6) | 2160 | 2070–2250 | 8015 | D1907 |
| Finish, % | 0.60 | 0.00–1.20 | In-Area | D2259 (2) |
| Moisture Regain (Commercial), % | 3.5 | — | — | D1909 (3) |

(1) Du Pont adds twist, using 1.1 twist multiplier, before testing.
(2) Du Pont uses analysis of IR spectra. Substitute ASTM method is Soxhlet solvent extraction.
(3) Arbitrary value adopted by ASTM.
(4) Improved computer-aided tensile testing software and hardware is being installed for yarn testing. This system will allow tensile testing using the ASTM D885 method, except that yarn will be tested with 1.1 twist multiplier of twist added. After installation and checkout of the new system in the spring of 1987, the nominal value for elongation at break will increase by 0.02%, and the nominal value for modulus will decrease by 25 gpd.
*Du Pont Registered Trademark It is noted in accordance with Table II the KEVLAR ® has a breaking strength in the range of 400 N to 520 N. Additionally, it is accepted throughout the industry that a waterblocking member consististing of a LANSEAL-F yarn has a breaking strength of about 22 N to 45 N which as a result renders it unsuitable for use as a strength member in optical fiber cable.

The core is enclosed by a sheath system 30 which includes a water blockable strength member system 32 that encloses the optical fiber components, and an outer plastic jacket 34. The water blockable strength member system 32 comprises a plurality of longitudinally extending members 33—33 which may be disposed in two layers. Each member 33 is a relatively high strength fibrous material such as KEVLAR ® yarn which has been treated with a water swellable liquid superabsorbent material which may be the same as that used to provide water blocking capability for the strength member system 27 of the optical fiber component 24. An array of such members 33—33 also could be used to provide the central organizer member. Further, as can be seen in FIGS. 2 and 3 each member 33 of the strength system 32 is substantially rectangular in cross-sectional shape. Advantageously, the treated yarn is hydrophilic. A hydrophilic material is one that has a strong affinity for water in that it absorbs water easily.

The superabsorbent material provides each strength member system with a water blocking capability. When water contacts the strength member system, the superabsorbent material reacts with the water to form a reaction product in the form of a gel. The gel is effective to block the flow of water.

Superabsorbents are hydrophilic materials which can absorb and retain water under pressure without dissolution in the fluid being absorbed. See J. C. Djock and R. E. Klern "Review of Synthetic and Starch-Graft Copolymer Superabsorbents" prepared for the Absorbent Products Conference held Nov. 16-17, 1983 in San Antonio, Tex. and incorporated by reference hereinto. Properties such as enzyme stability, biodegradability, absorbent capacity and rate of uptake are used to characterize a superabsorbent material. One of the early superabsorbents was a saponified starch graft polyacrylonitrile copolymer. See U.S. Pat. No. 3,425,971. The above-identified patent disclosed saponifying starch-graft polyacrylonitrile copolymers with aqueous bases.

The two major superabsorbents which are available today are cellulosic or starch-graft copolymers and synthetic superabsorbents. There are two major broad classes of synthetic superabsorbents. These are the polyelectrolytes and the nonelectrolytes. The polyelectrolytes are the most important and fall into four classes—polyacrylic acid superabsorbents, polymaleic anhydride-vinyl monomer superabsorbents, polyacrylonitrile-based superabsorbents and polyvinyl alcohol superabsorbents. Of these, the polyacrylic acid and polyacrylonitrile-based superabsorbents are most common. As with cellulosic-graft copolymer superabsorbents, the capacity of synthetic superabsorbents decreases with increasing salinity.

The polyacrylic acid class of superabsorbents includes both homopolymers and copolymers of acrylic acids and acrylate esters. The monomer units usually are polymerized to produce a water-soluble polymer which is then rendered insoluble by ionic and/or covalent cross-linking. Cross-linking of the polymer may be accomplished with a multivalent cation, radiation, or with a cross-linking agent. The absorbency of the product is determined by the number of ionizable groups, usually carboxylates, and the cross-linking density.

The cross-linking density affects not only the absorbency, but also the time required to absorb and the strength of the gel formed. Generally, the higher the cross-linking density, the stronger is the gel which is formed. The time to reach absorbent capacity decreases as the cross-linking density increases, and the absorbent capacity decreases.

The strength member systems 27 and 32 may be impregnated with any of several water blocking superabsorbent materials. After the strength member systems 27 and 32 have been impregnated, the superabsorbent material is dried to provide a film in and around the interstices of the fibrous strength members. In one embodiment, each is impregnated with a superabsorbent material which is derived from an aqueous solution comprising acrylate polymeric material which combines acrylic acid and sodium acrylate functionalities and water.

The impregnating material of another embodiment comprises a sodium salt of polyacrylic acid in which all the carboxylic groups may or may not be reacted with sodium. In other words, it is saponified in whole or in part. The level of saponification which may fall within a relatively wide range depends on desired properties.

Another superabsorbent material which may be used to provide water blocking capability for the fibrous strength member and which is preferred is one manufactured by the Chemdal Corporation of Arlington Heights, Ill. The preferred superabsorbent material is ARIDALL TM 1125F Superabsorbent Polymer available from the Chemdal Corporation. ARIDALL TM polymers are crosslinked acrylic polymers in a class referred to as superabsorbents which also includes starch-graft polymers, crosslinked glycolate and cellulose ethers. Such superabsorbents are acrylic based. These polymers derive absorbency from carboxylic groups attached to the spine of the polymer. The mechanism by which such material absorbs fluid is disclosed in a brochure published by the Chemdal Corporation.

In the cables of this invention, additional provisions are made for preventing the flow of water longitudinally along the cable into closures. Between the optical fibers 24—24 and the water blocking strength member system 32 are disposed supplementary water blocking members 36—36 such as yarn each of which is comprised of a water swellable fiber material. In the cable depicted in FIGS. 1 and 2, the yarn members 36—36 extend helically or parallel respectively, to the longitudinal axis of the cable. Water flow is prevented substantially by causing the yarn to be disposed between the strength member system and an outer jacket. It is important to distinguish the supplementary water blocking members 25 and 36—36 from the water blocking members 27 and 32. The members 27 and 32 provide the dual function of being not only water blocking members but also strength members whereas the water blocking members 25 and 36—36 perform no strength function.

In a preferred embodiment, each supplementary blocking member 36 is a yarn (see FIG. 1) such as a 50 denier yarn, for example, which is composed of a water swellable fiber material. Such a yarn is disclosed, for example, in U.S. Pat. 4,366,206 which is incorporated by reference hereinto. Yarn suitable for use as a member 36 in a cable 20 is manufactured by Japan Exlan Co., Ltd. of Osaka, Japan, under the trade designation "LANSEAL-F" superabsorbent fiber and is available commercially from Chori America, Inc. These members 36—36 extending longitudinally of the cable in the interstices shown add nothing to the outer diameter of the cable.

The yarn members 36—36 may extend substantially linearly along the cable parallel to its longitudinal axis so that each helically wound strength member of the system 32 crosses each yarn on each convolution. In the alternative, the yarn members 36—36 may be wound helically in an opposite direction from that of at least the adjacent layer of the helically wound strength members (see FIG. 1).

It is important to recognize the coverage of the water blockable members 33—33 in any given plane transverse of the longitudinal axis 21 of the cable. As can be seen in FIG. 2, the strength member system 32 extends about substantially the entire inner periphery of the cable in that plane. The combination of water blocking strength members 33—33 and the water blocking yarns 25 and 36—36 provide a balanced strength system as well as a distributed water blocking system.

Figures 4, 5:
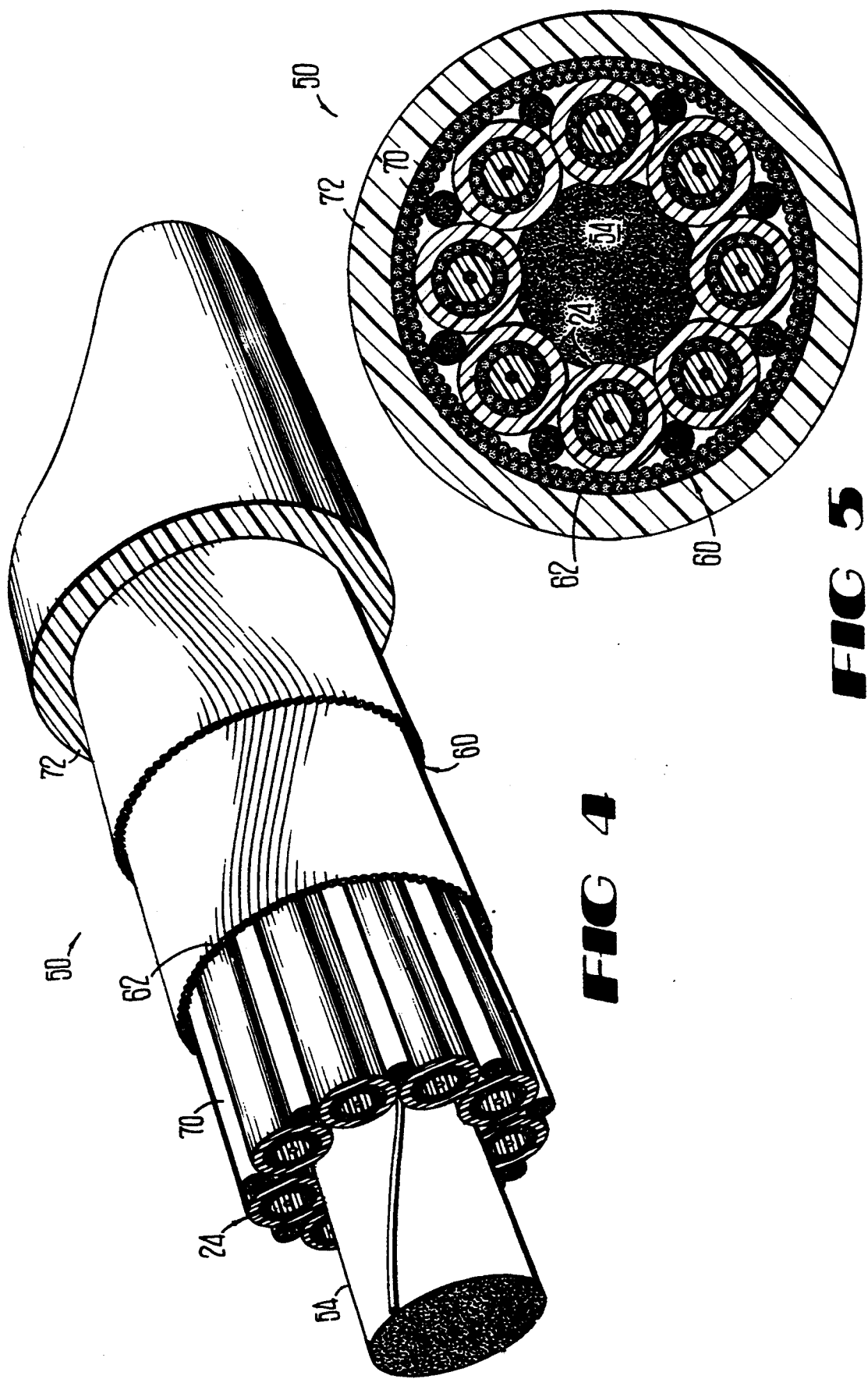
FIGS. 4 and 5 are perspective and end sectional views of still another cable which includes a water blockable strength member system.

Shown in FIGS. 4 and 5 is an alternative embodiment of a cable which includes water blocking strength members of this invention. A cable 50 includes a plurality of the optical fiber cable components 24—24 which are arrayed about a central organizing member 54. The central member 54 may include water blocking provisions. For example, the central member 54 may be a yarn which consist of fibers and which is treated with a superabsorbent material. The optical fiber cable components 24—24 are enclosed by a water blocking strength member system 60. As in the embodiment shown in FIG. 2, the water blocking strength member system 60 may comprise a plurality of flexible, water blocking, fibrous strength members 62—62.

Figure 6:
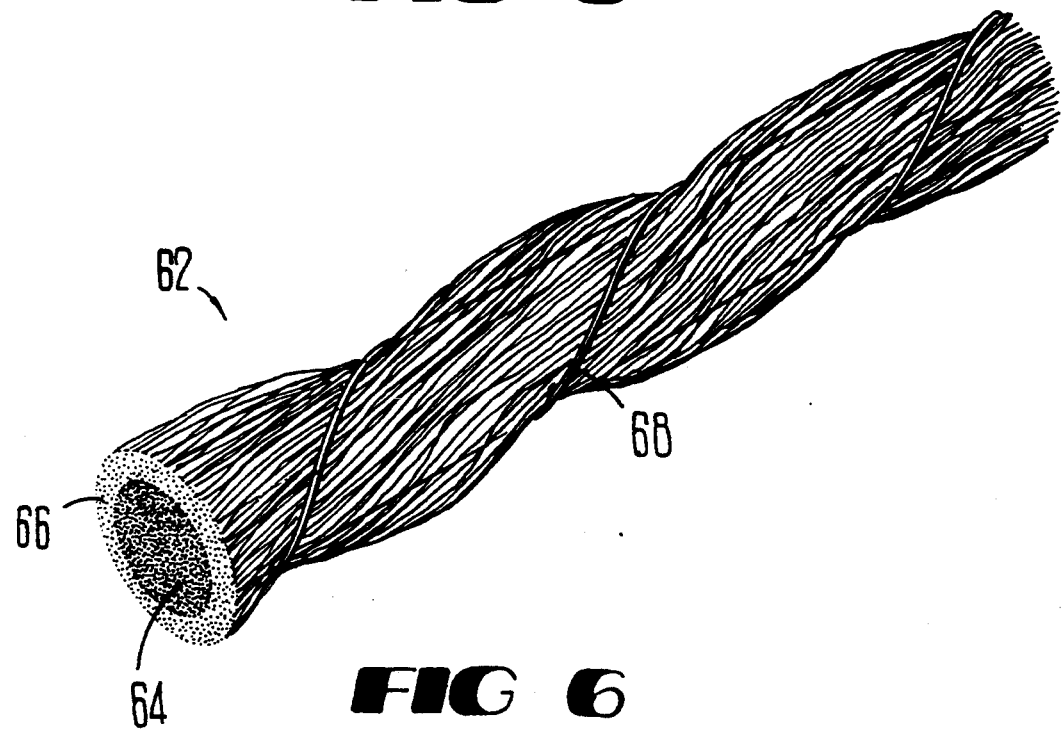
FIG. 6 is a perspective view of a portion of the water blockable strength member system of the cable of FIGS. 4 and 5.

In this embodiment which is shown in FIGS. 4–5, each of the water blocking strength members 62—62 may comprise a flexible, fibrous strength member 64 (see FIG. 6) which is wrapped helically with a superabsorbent fibrous material 66 such as "LANSEAL-F" fibers, for example. In a preferred embodiment, the strength member 64 is KEVLAR ® yarn and has at least about 90% of its outer peripheral area covered by the water blocking fibers 66—66. The water blocking fibers are held in engagement with the fibrous strength member by a binder ribbon 68 which may be a polyester material, for example. The binder ribbon may be wrapped in the same direction as the water blocking fibers but with a shorter lay. Of course, the fibrous strength member 64 and the superabsorbent material 66 may be twisted together.

In this embodiment, as in the embodiment shown in FIGS. 1 and 2, the superabsorbent material in the enclosing yarn 66 provides the cable 50 with water blocking capabilities. When water contacts the yarn 66, the superabsorbent material swells and forms a water blocking gel.

Further as shown in FIGS. 4 and 5, a plurality of supplementary water blocking members 70—70 such as yarn members are disposed between adjacent optical fiber components and the strength member system 60. Such water blocking members may be comprised of "LANSEAL-F" fibers, for example. Also, the central organizing member 54 is a linearly extending water blocking member that may be made of "LANSEAL-F" fibers, for example.

Enclosing the strength member system 60 is an outer jacket 72. The outer jacket 72 preferably is made of a plastic material. A polymeric material such as polyvinyl chloride, for example, may be used. In another embodiment, the outer jacket plastic is polyurethane.

Although the cable 50 has been described to include a plurality of the optical fiber cable components of the cable 20, other embodiments may be used. For example, instead of each buffered, coated optical fiber being enclosed with strength member yarn treated with a superabsorbent material, it may be enclosed with a plurality of KEVLAR ® yarns, for example, each of which has been wrapped with a water blocking yarn and bound with a ribbon.

It should be recognized that the strength member system of this invention comprises a fibrous material which is relatively supple. If the strength member system is impregnated with a superabsorbent material, it generally becomes somewhat less supple but still is relatively flexible.

What also is important is that the water blocking provisions of the cable of this invention become part of an already existing component of the cable, which component is relatively flexible. That component is a strength member system of the cable which is treated with a superabsorbent material or wrapped with a separate fibrous material which has been treated with a superabsorbent material. As a result, in the manufacture of the cable, a strength member system having water blocking provisions is introduced into the cable. This contrasts to the introduction of a flexible strength member system and water blocking provisions separate and apart from the flexible strength member system.

It has been found that the water blocking capabilities of this invention which are integral with the strength member system are exceptional. For example, in a cable 20 depicted in FIGS. 1 and 2, there was no water flow through a one meter cable length when subjected to a water head of seventeen meters over a period of six hours. In fact, when the one meter cable length was subjected to a water head of thirty-one meters for a period of eight hours, one example showed no water flow and a second example showed a water flow of only four milliliters.

It is within the scope of this invention to use not only a unidirectional fibrous strength member, but other strength members such as woven or braided fabrics as well. What is required is that the strength member be relatively flexible. It may be fiberglass, for example, or a fibrous material other than KEVLAR® yarn. Also, a somewhat low percentage of filaments of a KEVLAR® yarn could be replaced with water blocking filaments such as "LANSEAL-F" fiber and be used as the water blocking strength member.

It is to be understood that the above-described arrangements are simply illustrative of the invention. Other arrangements may be devised by those skilled in the art which will embody the principles of the invention and fall within the spirit and scope thereof.

We claim:

1. A waterblocking strength member for use in an optical fiber communications cable, said waterblocking strength member comprising:
    an elongated, supple yarn which is impregnated with a superabsorbent material and which has a breaking strength greater than 400 Newtons.

2. The strength member of claim 1, wherein said superabsorbent material coats each filament of said yarn.

* * * * *